United States Patent [19]
Maemura

[11] Patent Number: 5,455,936
[45] Date of Patent: Oct. 3, 1995

[54] DEBUGGER OPERABLE WITH ONLY BACKGROUND MONITOR

[75] Inventor: Kouji Maemura, Kanagawa, Japan

[73] Assignee: NEC Corporation, Tokyo, Japan

[21] Appl. No.: 234,566

[22] Filed: Apr. 28, 1994

[30] Foreign Application Priority Data

Apr. 28, 1993 [JP] Japan .................................. 5-102552

[51] Int. Cl.⁶ .................................................. G06F 11/30
[52] U.S. Cl. ..................... 395/183.11; 395/375; 395/700; 395/183.14; 395/500
[58] Field of Search .................................. 395/575, 375; 364/267.91, 261.3, 285.2, 245.5; 371/15.1, 19

[56] References Cited

U.S. PATENT DOCUMENTS 5,236,153  11/1993  Intrater et al. .......................... 395/575
5,329,630  7/1994  Baldwin .................................. 395/425

FOREIGN PATENT DOCUMENTS 03078038  4/1991  Japan .

*Primary Examiner*—Vincent P. Canney
*Attorney, Agent, or Firm*—Whitham, Curtis, Whitham & McGinn

[57] ABSTRACT

A debugger for a microprocessor, includes an instruction substituting circuit for tracing a memory access performed by the microprocessor and for substituting a predetermined branch instruction for an instruction which is read out from a predetermined address by the microprocessor; A background monitor is configured to give the microprocessor a memory space which is separated from the user space and is unique to the debugger. After the predetermined branch instruction has been substituted and after a break acknowledge signal indicating that an execution of the predetermined branch instruction has been activated, the debugger executes a program stored in the background monitor, and supplies a cache clear signal to the cache clear terminal at the start and end of the program in the background monitor.

7 Claims, 7 Drawing Sheets

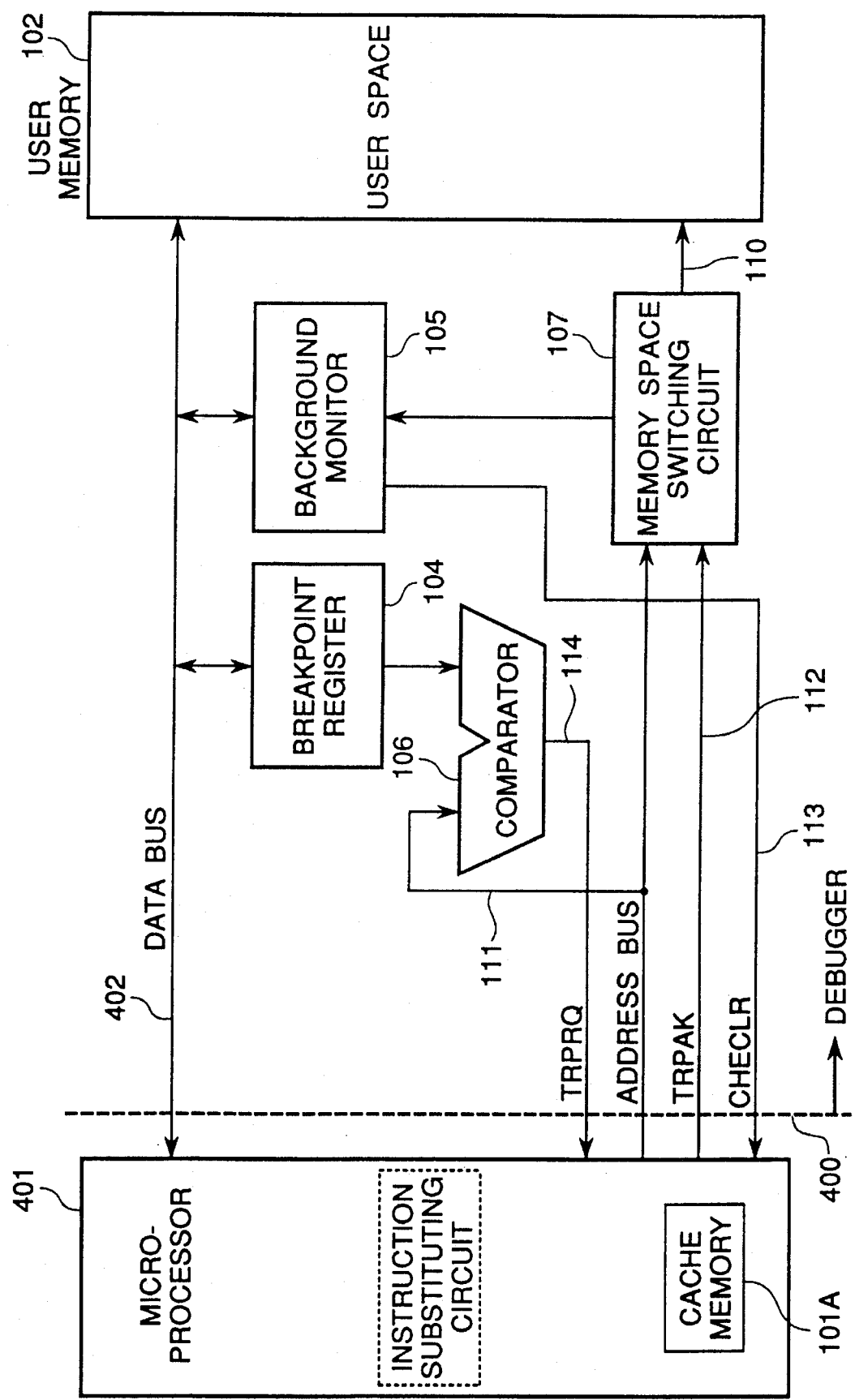

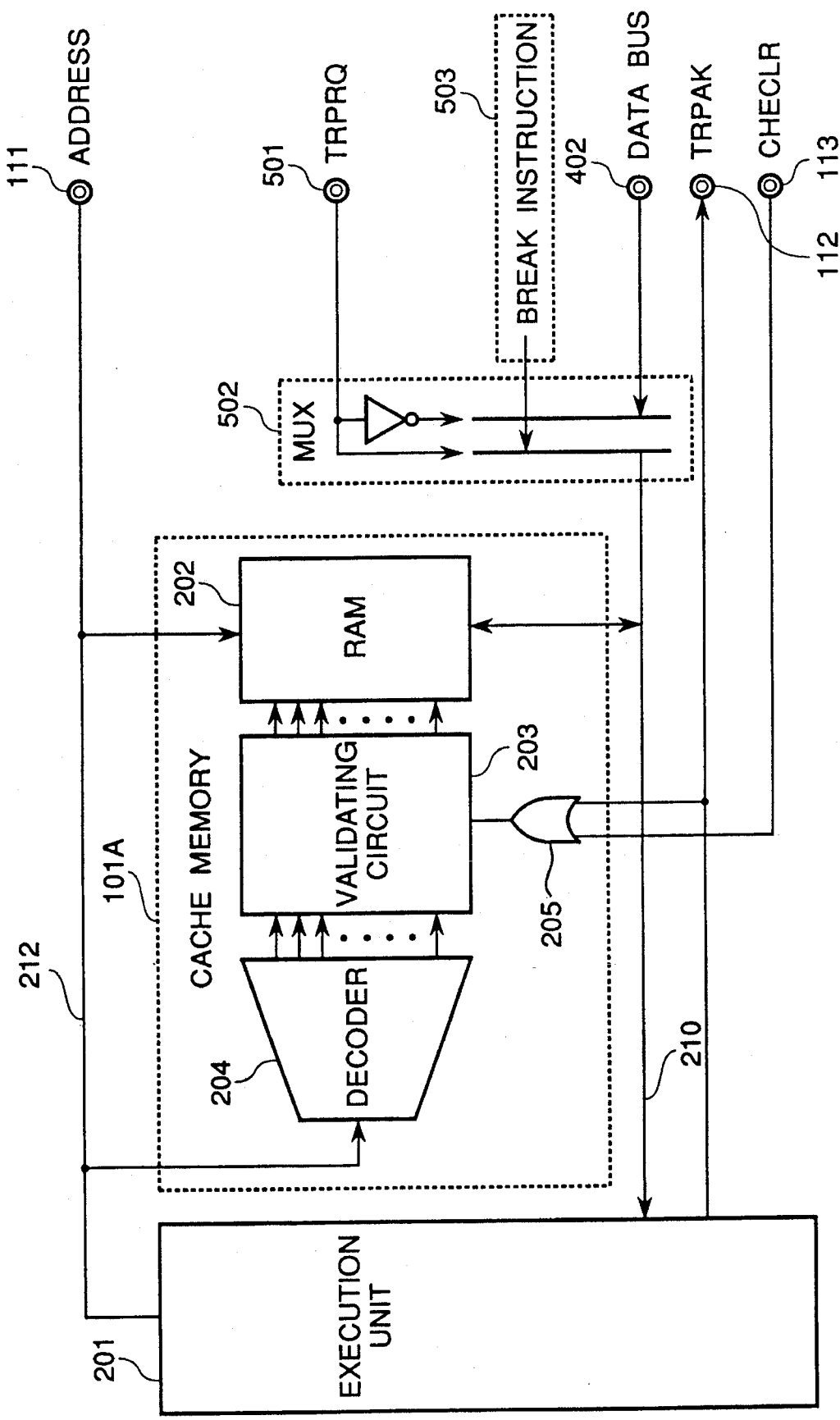

DEBUGGER OPERABLE WITH ONLY BACKGROUND MONITOR

BACKGROUND OF THE INVENTION

1. Field of the Invention

The present invention relates to a debugger for a microprocessor having a cache memory therein, and more specifically to a debugger which can break at an arbitrary address.

2. Description of Related Art

Recently, microprocessors increasingly have an internal cache memory for attaining a high speed memory access. Accordingly, the performance of microprocessors has become high, but, the process of debugging the system using this type of microprocessor has become difficult. The reason for this is that this type of microprocessor outputs its execution states only when a memory access is missed in the cache memory and therefore, it is not possible to monitor the current execution state of the program by tracing the memory access.

In the case of debugging a system having this type of microprocessor, a so called debugger is used. When only the executing process of a program is to be traced by the debugger, all memory accesses required by the microprocessor can be outputted to an external of the microprocessor by making the cache memory inactive (this state is called "cache off"). However, this tracing under the "cache off" state has a different executing time from a real operation of the microprocessor performed using the cache memory, and therefore, this debugging method is not as effective for a system required to have a real-time operation. In order to debug a real time operation while using the debugger, a break function is used to obtain the real time result. This break function causes the microprocessor to execute a branch instruction at an arbitrary address of a program. The other hand, a program for outputting an internal condition of the microprocessor and an intermediate result of the program execution which the user wishes to know are prepared, so that the user can observe whether or not an expected processing has been executed.

One typical conventional break function is disclosed in Japanese Patent Application Laid-open Publication No. Hei 03-078038 (JP-A-3-078038) entitled "In-Circuit Emulator".

Now, this typical conventional break function will be described with reference to FIG. 1.

In FIG. 1, a debugger is constituted by elements located at the right side of line 600, is coupled to a microprocessor 601 designates having a cache memory (not shown) therein and coupled to a first data bus 108 and an address bus 111.

More specifically, Reference Numeral 602 shows a user memory provided in a user system and coupled to a second data bus 109. Reference Numeral 603 indicates a front-end monitor which is provided on the user memory 602 and which is required to operated the debugger (it is necessary for the user of the debugger to prepare this memory region for a debugger). Reference Numeral 604 denotes a background monitor provided in the debugger, independently of the user memory 602, and coupled to the address bus 111 and the second data bus 109. Reference Numeral 605 symbolizes a memory space switching circuit, which is coupled to the address bus 111, the second data bus 109 and the user memory 602, and which operates to separate the background monitor 604 from the user space under the control of the front-end monitor. Reference Numeral 104 designates a breakpoint register coupled to the second data bus 109 configured to be set with a breaking point by a user. Reference Numeral 106 shows a comparator having a first input coupled to the address bus 111 and a second input coupled to the breakpoint register 104, for generating a coincidence signal or TRPRQ signal 114 when a coincidence is detected. Reference Numeral 103 denotes an instruction substituting circuit which substitutes a branch instruction for an instruction which should be read to the microprocessor, when the TRPRQ signal 114 is activated. This type of branch instruction is called a "break instruction".

When a user operates the break function, before execution of a debugging, the user sets the breakpoint register 104 with an address at which an interruption is caused. The comparator 106 compares an content of the address bus 111 outputted from the microprocessor 601 with a content of the breakpoint register 104. If they are concordant with each other, the TRPRQ signal 114 is activated. If the TRPRQ signal 114 becomes active, the instruction substituting circuit 103 substitutes the break instruction for the instruction which the microprocessor should read at that time.

Successive operations performed after this will be explained with reference to FIG. 2, which shows a timing chart of the operation of the conventional debugger.

Now, it is assumed that the breakpoint is set in an address "a", so that a break instruction is read into the microprocessor when the address "a" is accessed.

If the break instruction is executed by the microprocessor 601, the operation is branched to the head of a front-end monitor program. As mentioned above, the front-end monitor 603 is in a space which is reserved in the user memory 602 and which is utilized by the debugger. In accordance with the front-end monitor program, the front-end monitor 603 operates to turn the cache memory "off" and to analyze the primary factor of the break. If the front-end monitor 603 concludes a certain necessity of trap as the result of the primary factor analysis, it instructs the memory space switching circuit 605 to prevent, in succeeding accesses, the user memory is from being accessed, but allows the background monitor 604 to be accessed. As mentioned above, the background monitor 604 exists in the memory space on the debugger, independently of the user space. In the background monitor, a dump processing of an internal register is performed, and finally, a RETI (return-from-interrupt) instruction is executed so that the microprocessor 601 executes an original instruction before it was interrupted by the break instruction (called a "resumption instruction"). The resumption instruction is executed under the "cache off" condition. After the resumption instruction has been executed, the cache is returned back to the "cache on" condition. These controls of the cache are performed by the front-end monitor 603.

The prior art debugger as mentioned above needs the front-end monitor to perform the break function in the microprocessor including the cache memory therein. The following are the reasons why the front-end monitor 603 is necessary.

(1) The front-end monitor is required to switch the operation to the background monitor 604.

(2) The front-end monitor is required to switch over to the "cache off" condition in accordance with a monitor program. Generally, the change to the "cache off" can be controlled in accordance with the monitor program by either the background monitor 109 or the front-end monitor 603. However, the foreground monitor (frontend monitor 603) and the background monitor are not distinguished from each other in the microprocessor. Therefore, if this processing is performed by the background monitor, there is the possibility that an instruction registered in the cache memory is hit during an execution in the user space 602. Thus, a malfunction occurs. On the other hand, if the processing in question is carried out by the foreground monitor, since it is in the user memory space, even if the cache memory is hit, no malfunction occurs.

(3) There is no means for erasing the break instruction registered in the cache memory. Because of this, the resumption instruction after the break processing is executed under the "cache off" condition, so that the break instruction already registered in the cache memory is intentionally neglected. However, in the case that the address where the breakpoint is previously set, is accessed again, if the cache memory is hit, the breaking processing is repeated many times. As a result, the breaking point cannot be canceled until the end of the program. Therefore, it is necessary in the prior art for the front-end monitor 603 to judge the necessity of a break.

Because of the above mentioned reasons, the front-end monitor 603 has been used on the debugger in the prior art. The front-end monitor 603 uses the resources of the user system (for example, control signals for address bus of the user system, the user memory, etc.). This is disadvantageous in that a user's memory space (for examples addresses and contents of programs) is inevitably limited.

Further, in a case that the debugger itself utilizes the user system to debug a system under development, when a malfunction occurs in the user system, the monitor program itself does not properly function. The inherent function of the debugger itself cannot be exerted.

Furthermore, since as mentioned above the prior art debugger does not have the means for erasing the break instruction remaining in the cache memory, the front-end monitor 603 may operate unnecessarily to judge the necessity of the break instruction. Because of this, the ability to perform real time operation is lost in the user program execution.

SUMMARY OF THE INVENTION

Accordingly, it is an object of the present invention to provide a debugger which has overcome the above mentioned defect of the conventional teachings.

Another object of the present invention is to provide a debugger which can operate with only a background monitor, without a front-end monitor, so that a monitor program itself can operate on a memory separated from the user space and therefore causes not malfunction even if a malfunction occurs in the user system operating in the user memory space.

The above and other objects of the present invention are achieved in accordance with the present invention by a debugger for a microprocessor having the cache memory therein, the microprocessor having a function for erasing a content of the cache memory and being provided with a cache clear terminal for receiving a cache clear instruction signal from a device external to the microprocessor and a break acknowledge terminal for informing an execution of a predetermined branch instruction to a device external to the microprocessor.

The debugger comprising an instruction substituting circuit tracing a memory access performed by the microprocessor and substituting the predetermined branch instruction for an instruction which is read out from a predetermined address by the microprocessor, and a background monitor configured to give the microprocessor a memory space which is separated from a user space but is unique to the debugger, so that, after the predetermined branch instruction has been substituted and after the break acknowledge signal has been activated, the debugger executes a program stored in the background monitor, and supplies the cache clear signal to the cache clear terminal at the start and at the end of the program in the background monitor.

BRIEF DESCRIPTION OF THE DRAWINGS

FIG. 6 is a block diagram of a second embodiment of the debugger in accordance with the present invention;

FIG. 7 is a block diagram of an internal structure of the microprocessor in the first embodiment shown FIG. 6.

DESCRIPTION OF THE PREFERRED EMBODIMENTS

Now, some embodiments of the debugger in accordance with the present invention will be described with reference to the accompanying drawings.

Figure 1:
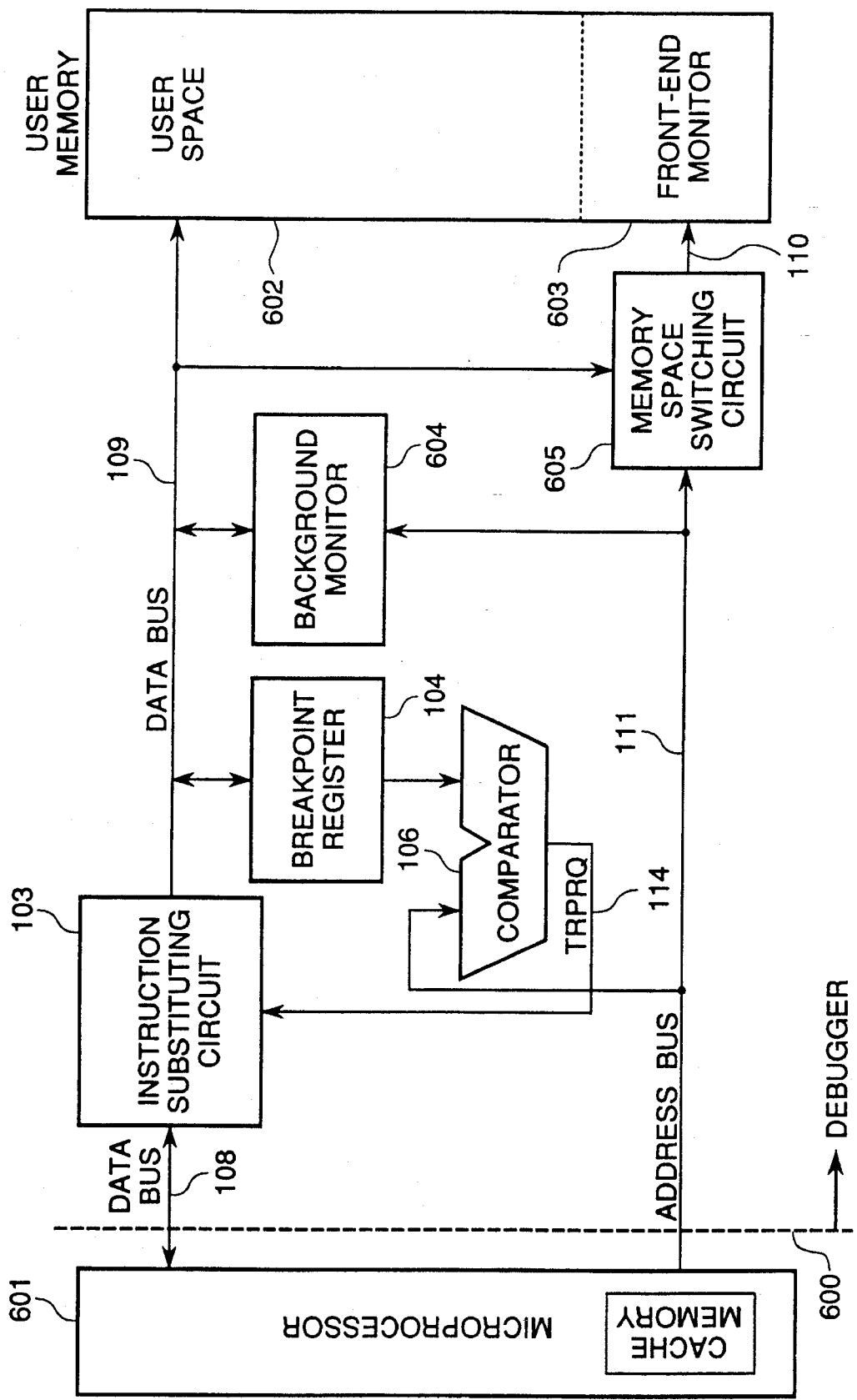
FIG. 1 is a block diagram of one typical conventional debugger.
Figure 2:
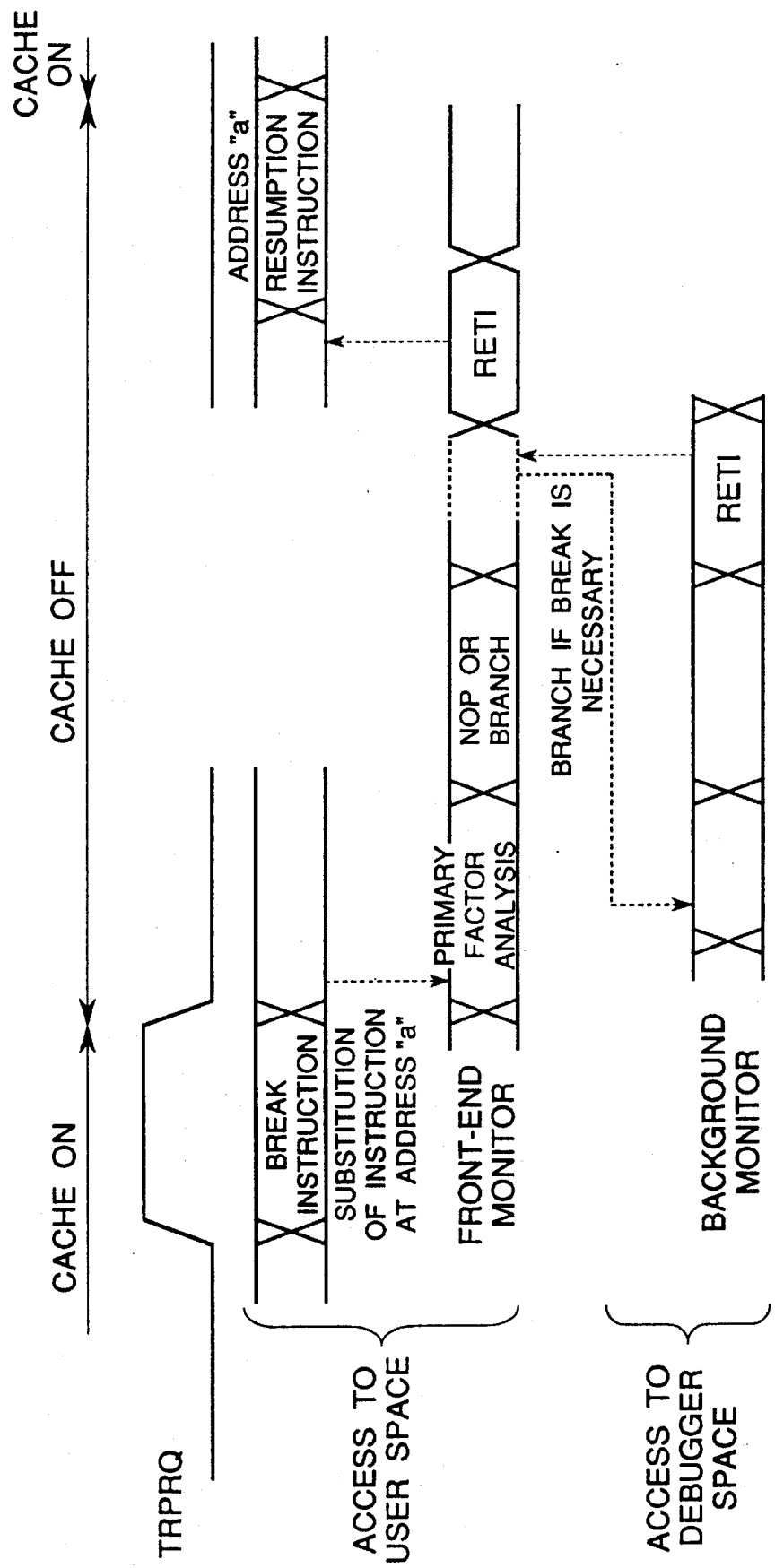
FIG. 2 is a timing chart illustrating an operation of the conventional debugger.
Figure 3:
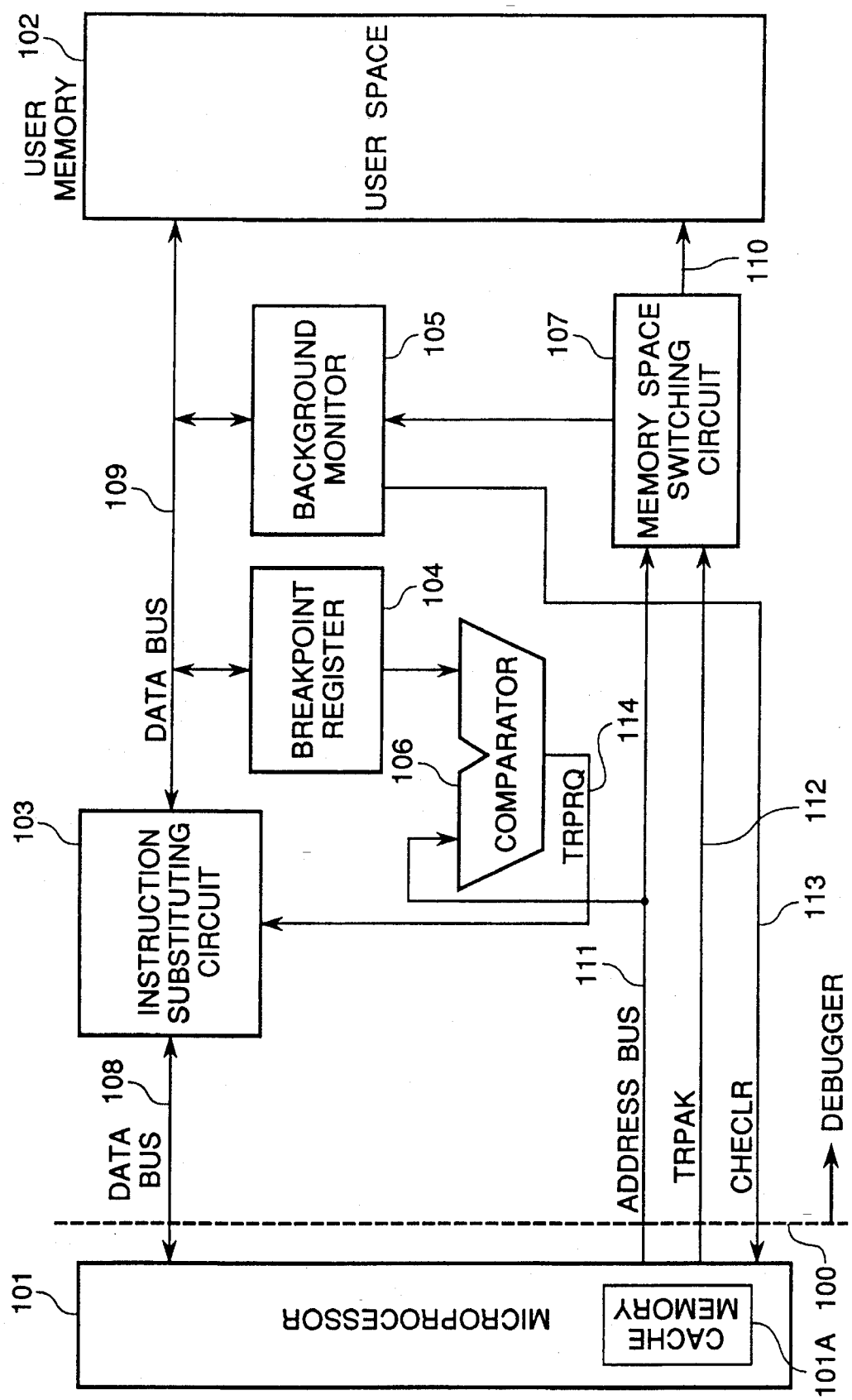
FIG. 3 is a block diagram of a first embodiment of the debugger in accordance with the present invention.

Referring to FIG. 3, there is shown a block drawing of the first embodiment of the debugger in accordance with the present invention. In FIG. 3, elements similar or corresponding to those shown in FIG. 1 will be given the same Reference Numerals.

As shown in FIG. 3, the debugger in accordance with the present invention is constituted by elements located at the right side of line 100, and is coupled to a microprocessor 101 which has a cache memory 101A therein and which is also coupled to a first data bus 108 and an address bus 111. This microprocessor 101 is configured to generate a TRPAK signal 112 for informing that the microprocessor 101 has executed a break instruction, and also to receive a CHECLR signal 113 instructing erase of the internal cache memory 101A provided in the microprocessor 101.

The debugger includes a user memory 102 provided in a user system and coupled to a second data bus 109, a background monitor 105 provided independently of the user memory 102 and coupled to the second data bus 109, for generating the above mentioned CHECLR signal 113. The debugger also includes a memory space switching circuit 107 which is coupled to the address bus 111 and the user memory 102 through another address bus 110, and which is also connected to receive the TRPAK signal 112, for controlling the background monitor 105 and the user memory 102, so as to switch the access of the microprocessor 101 from the user memory 102 to the background monitor 105 in response to an activated TRPAK signal 112. A breakpoint register 104 is coupled to the second data bus 109 and is configured to be set with a breaking point by a user. A comparator 106 having a first input coupled to the address bus 111 and a second input coupled to the breakpoint register 104, activates a coincidence signal or TRPRQ signal 114 when a content of the breakpoint register 104 becomes coincident with a content on the address bus 111. An instruction substituting circuit 103 is coupled to the first and second data buses 108 and 109 and is controlled by the TRPRO signal 114 so as to substitute a break instruction for an instruction which should be read to the microprocessor, when the TRPRO signal 114 is activated.

Figure 4:
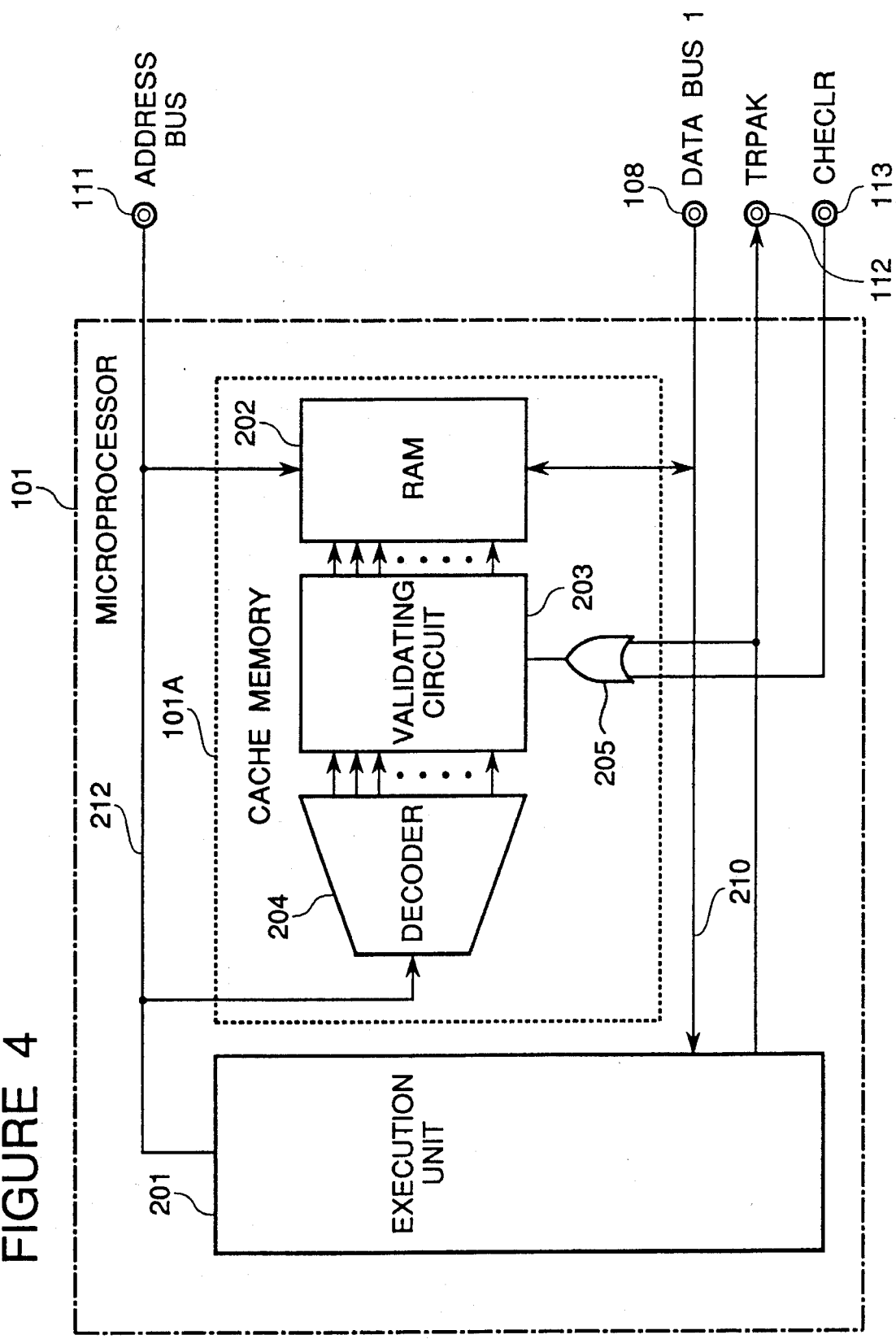
FIG. 4 is a block diagram of an internal structure of the microprocessor in the first embodiment shown in FIG. 3.

Referring to FIG. 4, an internal structure of the microprocessor 101 is shown.

As shown in FIG. 4, the microprocessor 101 is composed of an execution unit 201 and the cache memory 101A, which are coupled to an internal data bus 210 connected to the data bus 108 and also coupled to an internal address bus 212 connected to the address bus 111. The execution unit 201 generates the above mentioned TRPAK signal 112.

The cache memory 101A includes a RAM (random access memory) 202 having an input connected to the internal address bus 212 and an output connected to the internal data bus 210, and a decoder 204 coupled to the internal address bus 212 for selectively activating a plurality of decoded lines. A validating circuit 203 is coupled between the decoder 204 and the RAM 202 and connected to receive through an OR gate 205 the TRPAK signal 112 and the CHECLR signal 113.

Now, an operation of the first embodiment will be explained with reference to FIGS. 3 and 4.

In the case of utilizing the break function of the debugger, a user sets the breakpoint register 104 with an address where an interruption is to be generated, in advance of execution of a debugging. The comparator 106 continuously compares the content of the breakpoint register 104 with the content on the address bus 111, and if the two contents become coincident, the comparator 106 informs the instruction substituting circuit 103 of the detected coincidence, by activating the TRPRQ signal 114.

In response to the activated TRPRQ signal 114, the instruction substituting circuit 103 outputs the break instruction (or a branch instruction) to the data bus 108 instead of an instruction code read from the user memory 102. By this action of the instruction substituting circuit 103, the break instruction is written in the RAM 202 of the microprocessor 101. At the same time, in order to indicate the validity of the information written in the cache memory (RAM 202), a corresponding entry in the validating part 203 is set. When the execution unit 201 executes a given instruction, it retrieves the cache memory at first, and if the cache memory is hit, the execution unit 201 reads the instruction code from RAM 202, so that the execution unit 201 executes the read instruction. If the instruction executed by the executing unit 201 is the break instruction, the TRPAK signal 112 is activated by the execution unit 201. Accordingly, the validating circuit 203 is cleared by the activated TRPAK signal 112, and as a result, the cache memory is correspondingly cleared.

The reason for clearing the cache memory at this stage is as follows, after the operation has been switched to the background monitor, if the same instruction is used in the user space and the cache memory, a malfunction occurs. The cache memory can be also cleared by the CHECLR signal 113 from a device external to the microprocessor 102.

Thereafter, in order to branch to a predetermined address (designated by the break instruction) the execution unit 201 outputs a branch destination address to the address bus 111.

On the other hand, in response to the activated TRPAK signal 111 notifying that the execution unit 201 has executed the break instruction, the memory space switching circuit 107 selects the background monitor 105 so that the access is to the background monitor 105, not to the user memory 102. A program for outputting the execution state to the memory is written in the background monitor 105. Thereafter, the microprocessor 101 executes the program written in the background monitor 105.

Figure 5:
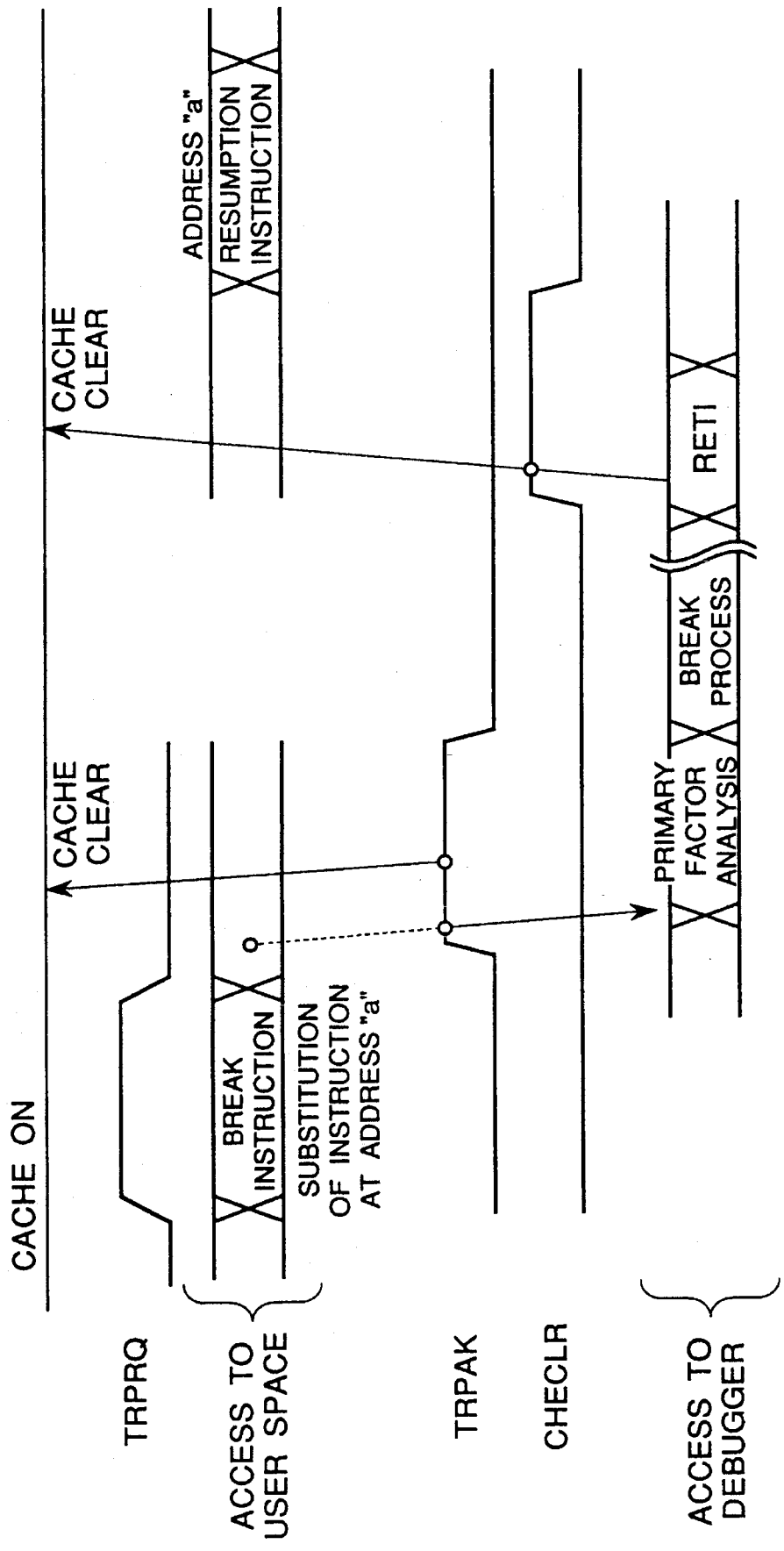
FIG. 5 is a timing chart illustrating an operation of the debugger shown in FIG. 3.

The operation performed after this will be explained with reference to a timing chart of FIG. 5. The background monitor 105 analyzes the primary factor of the break processing, etc., and then, indicates to clear the cache memory, and executes the RETI instruction at last. After the RETI instruction is executed, the user program is resumed. The indication for clearing the cache memory is informed to the microprocessor by activating the CHECLR signal 113. With this operation, the break instruction registered in the cache memory is erased, and the series of break processing is ended.

In the first embodiment mentioned above, the debugging can be executed with only the background monitor 105 without using the front-end monitor. Furthermore, without transition to the "cache off" condition which was required in the prior art debugger, and by clearing the cache memory at the start and at the end of the background monitor, the break processing can be executed while continuously maintaining the "cache on" condition.

Next, a second embodiment of the debugger in accordance with the present invention will be explained with reference to FIGS. 6 and 7.

FIG. 6 shows a block diagram of the second embodiment of the debugger in accordance with the present invention. In FIG. 6, elements similar or corresponding to those shown in FIG. 3 are given the same Reference Numerals, and explanation thereof will be omitted.

As will be seen from comparison between FIGS. 3 and 6, the second embodiment is different in construction from the first embodiment except that, in place of the instruction substituting circuit 103 independently provided in the first embodiment, a microprocessor 401 provided in the second embodiment internally includes an instruction substituting function, and the TRPRO signal 114 generated by the comparator 106 is correspondingly supplied to the microprocessor 401, and in addition, the microprocessor 401 is directly coupled to the user memory 102 via a data bus. The other features of the second embodiment are the same in construction as the corresponding ones of the first embodiment, and furthermore, an operation of the second embodiment is the same as that of the first embodiment. Therefore, further description will be omitted.

Referring to FIG. 7, there is shown a block diagram of an internal structure of the microprocessor 401. In FIG. 7, elements similar or corresponding to those shown in FIG. 4 are given the same Reference Numerals, and explanation thereof will be omitted.

Reference Numeral 501 designates an input terminal for receiving the TRPRQ signal 114, and Reference Numeral 502 denotes a multiplexer provided as the instruction substituting circuit. The multiplexer 502 has a first input for receiving a break instruction from for example a break instruction 503 and a second input for receiving the data on the data bus 402, and controlled by the TRPRQ signal 501 so as to select the break instruction only when the TRPRQ 501 signal is active and the data bus 402 in the other situations.

As mentioned above, in the debugger of present invention, a debug operation can be executed by the background monitor without using the frontend monitor. Therefore, the debugger of present invention is applicable to all user systems without limiting the user memory space (especially, address and contents of program, etc.). In addition, since the background monitor utilizes only the resource within the debugger, independent of the user space, even if malfunction occurs in a system being developed by the user, the monitor program itself does not malfunction. Accordingly, an effective program debugging can be performed.

Furthermore, because the microprocessor operates on the "cache on" condition, it is possible to debug a user program in its real time execution.

The invention has been described with the reference to the preferred embodiments. However, it should be noted that the present invention is in no way limited to the illustrated structure, but changes and modifications may be made within the scope of the appended claims.

I claim:

1. A debugger for a microprocessor having the cache memory therein, said microprocessor having a function for erasing a content of said cache memory and being provided with a cache clear terminal for receiving a cache clear instruction signal from a device external to said microprocessor and a break acknowledge terminal for outputting a break acknowledge signal informing an execution of a predetermined branch instruction to a device external to said microprocessor, said debugger comprising:
an instruction substituting circuit tracing a memory access performed by said microprocessor and substituting said predetermined branch instruction for an instruction which is read out from a predetermined address by said microprocessor, and a background monitor configured to give said microprocessor a memory space which is separated from a user space but is peculiar to the debugger, wherein, after said predetermined branch instruction has been substituted and after said break acknowledge signal has been activated, the debugger executes a program stored in said background monitor, and supplies the cache clear signal to said cache clear terminal at a start and at an end of said program in said background monitor.

2. A debugger claimed in claim 1 further including a breakpoint register for storing predetermined address where a branch should occur, a comparator for comparing the content of said breakpoint register and a content of an address bus, and for activating a coincidence signal when the content of said breakpoint register becomes coincident with the content of said address bus in time, said coincidence signal being supplied to said instruction substituting circuit.

3. A debugger claimed in claim 2 wherein, in response to said activated coincidence signal, said instruction substituting circuit outputs the break instruction to said microprocessor, so that the break instruction is written into said the cache memory.

4. A debugger claimed in claim 1 wherein a program written in the background monitor is configured to output an execution condition of the microprocessor.

5. A debugger claimed in claim 1 wherein said instruction substituting circuit is included in the microprocessor.

6. A debugger claimed in claim 5 wherein said instruction substituting circuit comprises of a multiplexer, which receives the break instruction and the content on a data bus, said multiplexer being controlled by said coincidence signal so as to select said break instruction only when the coincidence signal is active and said data bus in other situations.

7. A debugger claimed in claim 1 wherein after the instruction has been substituted and after the acknowledge terminal has become active, the microprocessor executes the program stored in the background monitor, and erases said cache memory in response to each of said break acknowledge signal and said cache clear instruction signal, so that said cache memory is erased at the start and at the end of the program of said background monitor.

* * * * *